March 22, 1960 R. M. PICKARD ET AL 2,929,224
GAS TURBINE COMPRESSOR DRIVEN AIR CONDITIONING SYSTEM
Filed Dec. 23, 1955
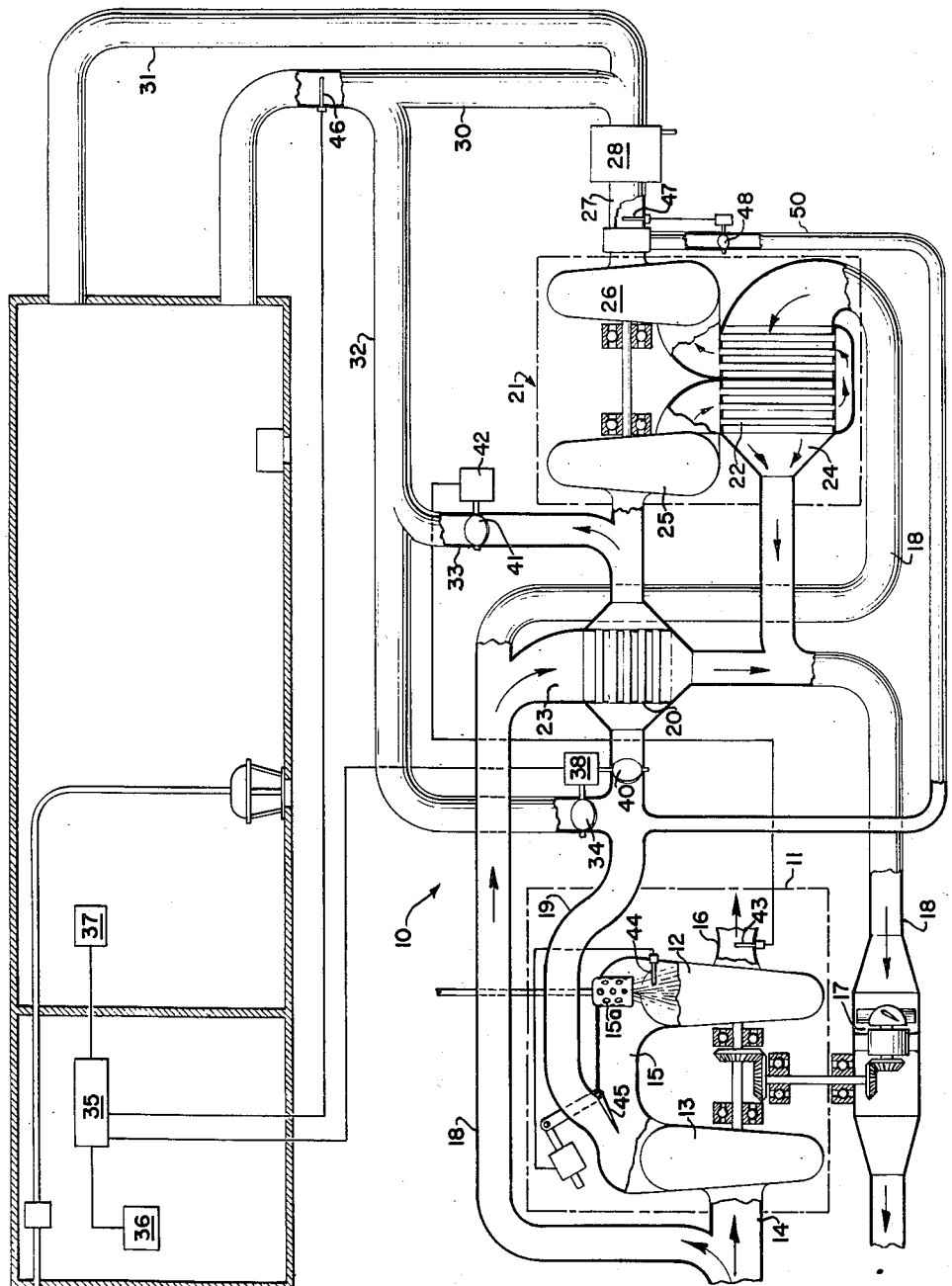
ROBERT M. PICKARD,
ALEXANDER SILVER,
INVENTORS.
BY John H. J. Wallace

United States Patent Office 2,929,224
Patented Mar. 22, 1960

2,929,224

GAS TURBINE COMPRESSOR DRIVEN AIR CONDITIONING SYSTEM

Robert M. Pickard, Hermosa Beach, Calif., and Alexander Silver, Phoenix, Ariz., assignors to The Garrett Corporation, Los Angeles, Calif., a corporation of California Application December 23, 1955, Serial No. 555,058

15 Claims. (Cl. 62—172)

This invention relates generally to air conditioning systems and, more particularly, to a system and apparatus for conditioning the air used to ventilate, heat and/or cool enclosures, such as the cockpit and cabin of an airplane.

An object of this invention is to provide a system for conditioning air for enclosures, either of the vehicular or non-vehicular type, the system utilizing a turbine driven compressor as a primary source of heated air, a refrigeration unit with an air turbine driven compressor and heat exchangers for tempering or cooling the air and a novel arrangement of control valves for automatically regulating the flow of air to secure desired temperatures in the enclosure served by the system.

Another object of this invention is to provide an air conditioning system for use in relatively small, as well as large, airplanes, which system will completely condition compartment or cabin air, be independent of the main aircraft engines, and be fully automatic in operation except for the manual actuation of temperature selection controls.

Another object of the invention is to provide an air conditioning system having means for supplying heated air under pressure, means for cooling or refrigerating all or a portion of such air, means for dehumidifying the air, means for mixing heated and refrigerated air to secure a desired temperature, and control means to regulate the flow of air to protect certain components of the system and prolong their useful life.

Still another object of the invention is to provide an air cycle system for conditioning the air used for ventilating, heating and cooling an aircraft enclosure, the system having a primary compressor operated by a gas turbine, duct means for conveying the air from the compressor to heat exchangers and then to the enclosure, and valve devices in the duct means for controlling the volume of air permitted to flow through certain portions of the duct means, the system being further provided with thermally controlled means for actuating the valve devices, such thermally controlled means being responsive to temperatures obtaining in a part of the gas turbine, which temperatures reflect the loading of the turbine driving the compressor, the operation of the valve devices serving to confine the loading of the turbine to a predetermined range whereby the system will be operated with maximum efficiency, reliability and length of life.

A further object of the invention is to provide an air conditioning system for an airplane cabin, such system having a gas turbine compressor unit for supplying air, an arrangement of ducts leading from the compressor and containing heat exchange and refrigerating units and means for directing the air through or around such units to secure the most desirable temperature, the air-directing means consisting of valves for controlling the flow of air through certain portions of the ducts, such valves being controlled in part by the temperature in the cabin and in part by the temperature in the outlet of the turbine which operates the compressor.

Another object of the invention is to provide an aircraft cabin air-conditioning system having a gas turbine driven compressor for supplying heated air and apparatus operated in part by such air to refrigerate the air before delivery to the cabin, the system also being provided with valve means for sending all the air from the compressor directly to the cabin to secure maximum heating thereof or for sending all the air through the refrigerating apparatus to provide a maximum cabin cooling effect, the valve means also being operable to mix the warm and refrigerated air for modulated temperature operation, certain of the valve means being controlled in response to temperature variations in the cabin and other valve means being controlled in response to temperature variations in a portion of the gas turbine, the operation of the latter valve means being independent of the former valve means and serving to limit the thermal operating range of the gas turbine, thereby serving as an efficiency and safety control means.

Further objects of the invention will be brought out in the following part of the specification wherein detailed description is for the purpose of fully disclosing the invention without placing limitations thereon.

In the drawing the single figure is a combination diagrammatic and schematic view of an air conditioning system embodying the present invention.

In the drawing, the numeral 10 designates the air conditioning system in its entirety. This system is shown in connection with the pilot and passenger compartments of an airplane. The system comprises a prime mover, including a gas turbine compressor unit 11 which may be of conventional form, having a gas turbine 12 and a compressor 13 connected for operation by the turbine, the compressor having an air inlet 14 which may be arranged to receive ram air during the movement of the airplane in which the air conditioning system is incorporated. The outlet 15 of the compressor leads to the inlet of the turbine and supplies this member with air under pressure mixed with fuel in a combustion chamber 15a to effect the operation of the turbine in the usual manner. Exhaust gases from the turbine pass from the outlet 16 to the atmosphere. The shaft connecting the turbine with the compressor is, in the present instance, provided with gearing by which power is transmitted from the prime mover to a fan 17 employed to circulate air from the atmosphere through portions of the system. In this instance, such portions comprise branch ducts 18, which may also connect with the compressor inlet 14, to receive ram air. When the airplane is not in motion the fan will serve to draw air through the ducts to effect heat exchange. The fan will also assist in moving air through the ducts 18 when the airplane is in motion.

A bypass or bleed duct 19 branches from the outlet of the compressor to conduct air under pressure from the latter device to the passenger compartment of the airplane. This passage 19 includes portions containing the air conditioning apparatus. In the present system, this apparatus includes a primary heat exchanger 20 and a refrigeration unit 21, the latter including a secondary heat exchanger 22. Heat exchangers 20 and 22 are of the air-to-air type and include passages 23 and 24 which communicate with the branch duct 18 to receive air from the atmosphere. As previously pointed out, this air may be ram air caused by forward movement of the airplane, or air induced by the fan 17, or both.

After passing through the primary heat exchanger, the bleed air passage 19 extends to the inlet of a compressor 25, forming a part of the refrigeration unit 21. The latter unit includes an air turbine 26 for converting energy contained in the bleed air, into motion and transmitting this motion to the compressor 25. The air entering the compressor 25 has been reduced in temperature by flowing through the primary heat exchanger where some of the heat contained in the air and intensified due to compression in the compressor 13, is transmitted to the air flowing through the passages 18 and 23. The heat thus extracted from the bleed air will be conducted to the exterior of the airplane by atmospheric air assisted by the fan 17. The bleed air exhausted from the compressor 25 is again cooled by flowing through the secondary heat exchanger which, in this instance, is of the double-pass type, the air being cooled again by atmospheric air, to a temperature within a few degrees of such atmospheric air. Following passage through the secondary heat exchanger, the bleed air will be expanded by flowing through the turbine 26 and will deliver energy contained therein to the moving elements of the turbine to cause the operation of the compressor 25. The expansion of the air in this manner results in a further reduction in temperature.

After passing through the turbine 26, the air flows through an outlet duct 27 and through a water separator 28 which serves to remove moisture condensing in the air during the cooling and expanding operations. From the water separator, the air passes through ducts 30 and 31 leading to the passenger compartment. The duct 31 may be termed a cold air duct, the air passing therethrough being generally employed to supply the passengers through individually controlled outlets. Duct 30 has a second duct 32 connecting therewith, this duct leading from the duct 19 in advance of the primary heat exchanger. Duct 32 is also connected, by a branch 33, with the duct 19 between the outlet of the primary heat exchanger 20 and the inlet of the refrigeration unit. The branch duct 33 may be termed a refrigeration unit by-pass. At the point where the by-pass 32 communicates with the bleed duct 19, the former is provided with a valve element 34, this valve element being of any suitable power operated type and being controlled from the pilot's cockpit by an air temperature control 35. The control 35 may be manually operated in any suitable manner through the manipulation of a cabin temperature selector 36. A thermoresistor 37 is disposed in the passenger compartment to effect the automatic operation of the control 35 in response to temperatures obtaining in the passenger compartment.

The operating mechanism 38 for the valve 34 also actuates a second valve 40 disposed in the inlet to the primary heat exchanger. Valves 34 and 40 are so arranged that when one moves in an opening direction, the other moves in a closing direction; both are operated by the actuating mechanism 38. When the control 35 signals for warm air to heat the cabin, valve 34 will be moved in an opening direction, while valve 40 is moved in a closing direction. Bleed air will then by-pass the primary heat exchanger and the refrigeration unit and flow directly to the cabin through the by-pass 32 and duct 30. The bleed air contains heat due to the compression and will serve to increase the temperature in the cabin. Under normal conditions, valve 34 will be only partially open, as will valve 40, so that the temperature of the air flowing into the cabin will be modulated. Under certain conditions, however, such as when the airplane is on the ground in a warm atmosphere, valve 34 may be completely closed so that cool air only will be supplied to the cabin. Or, when the airplane is operating in cold regions, the valve 40 may be completely closed, so that only warm air will be supplied.

During the maximum cooling operation, on the ground and in flight up to an altitude of approximately 6,000 feet, all air to the cabin passes through the cooling turbine 26 and is, therefore, limited in volume to the capacity of the turbine 26, the nozzle of which is designed to admit the amount of air available from the gas turbine at the bleed air conditions existing at such altitude. At higher altitudes, however, the flow through turbine 26 is inadequate for cabin ventilation and drops below the flow capability of the gas turbine compressor unit 11. To compensate for this condition the refrigeration by-pass 33 has been provided. This by-pass is equipped with a valve 41 which is normally closed during operation of the system at altitudes under 6,000 feet. When, however, the gas turbine is operating below its design capacity, the actuating mechanism 42 for the valve 41 will be energized, upon receiving a signal from a thermostat 43 disposed in the outlet or exhaust stack 16 of the gas turbine, and valve 41 will be moved toward an open position. Thermostat 43 is set to control the operation of valve 41 when the turbine outlet temperatures are in the lower end of a range between 900 and 1060° F.

When valve 41 is opened, a flow path of reduced resistance through conduit branches 33, 32 and 30 to the passenger compartment is provided. This valve modulates the air flow passing through it from zero flow at 6,000 feet to approximately one-half of the total air flow delivered by the gas turbine at 20,000 feet during maximum cooling operation. In effect, this control maintains cabin air flow close to the design output of the gas turbine. The opening of valve 41 tends to increase the load on the gas turbine and causes a speed responsive governor (not shown) to actuate the fuel valve and admit more fuel. The operating temperature of the turbine will thus be raised.

During heating or modulated operation of the system at any altitude and ambient condition, the thermal by-pass valve 34 is modulated open. This action also opens a flow path of lower resistance for the bleed air with a consequent tendency to over-bleed the gas turbine. As above set forth, the establishment of a low resistance path for the bleed air tends to cause the turbine operating temperature to increase.

A maximum temperature limit control is provided by utilizing a second thermostat 44 which serves to effect the operation of a valve 45 located at the point of communication of the bleed duct 19 with the outlet of the compressor 13. Valve 45 will be moved toward a closed position to limit the volume of air bled from the compressor when the temperature in the turbine exhaust stack 16 increases to a predetermined maximum, for example, 1060° F. When valve 45 closes, the load on the turbine is decreased and the fuel valve will then move in a closing direction, this valve being actuated as indicated above by a speed sensing mechanism, or governor, not shown.

The conditioned air delivery passage 30 is also provided with a thermostat or thermoresistor 46 which serves as an anticipating heat control, the thermoresistor 46 being connected with the air temperature control 35. Element 46 tends to prevent over-control and excessive fluctuation of the temperature in the cabin.

Since the air delivered from the refrigeration unit may contain a considerable amount of moisture, and may be at a sufficiently low temperature to cause the moisture to freeze and render the system inoperative, anti-icing means are provided in the duct 27 to serve as a low temperature limiting device. This means includes a thermostat 47 to effect the operation of a valve 48 which is disposed in a bleed line 50 communicating with the bleed line 19 in advance of the primary heat exchanger. When valve 48 is open, heated air will be introduced into the duct 27 at the outlet of the turbine 26. The thermostat 47 is adjusted to maintain the temperature in the duct 27 at approximately 35° F.

The operation of the air conditioning system may be summarized, as follows: Air is introduced into the inlet of the main compressor 13 by forward motion of the airplane and by the operation of the compressor 13. Some of this air is bled from the outlet of the compressor through the bleed passage 19 and passed through the primary heat exchanger 20 where it is partially cooled. This air is then introduced into the inlet of the compressor 25 and flows through a secondary heat exchanger 24 where the temperature is further reduced. This cool air is then expanded by passing through a turbine 26, the expansion of the air still further reducing the temperature. This cooled air flows from the turbine through one or more ducts into the passenger compartment of the airplane to effect a cooling operation. In the event the temperature in the passenger compartment is below a previously selected figure, an air temperature control will be actuated to cause valves 34 and 40 to move to by-pass the proper amount of bleed air around the primary heat exchanger and refrigeration unit, this by-passed air, which contains heat due to previous compression, mixing with the refrigerated air and flowing into the cabin. As the temperature reaches the selected maximum, valves 34 and 40 will be operated to increase the amount of air flowing through the cooling units and decrease the air by-passing these units. It will be obvious that the temperature control will seek to maintain valves 34 and 40 in the proper positions to secure the most desirable temperature.

One of the features of the invention resides in controlling the loading of the prime mover. This feature is secured through the use of valves 41 and 45, the first of which causes the bleed air to by-pass the refrigeration unit and, thus, increases the load on the prime mover. As pointed out previously, valve 41 is controlled by a thermostat 43 located in the exhaust stack of the turbine 12. This thermostat 43 actuates valve 41 to limit the lower temperature of the turbine. The second thermostat 44, which controls the valve 45, limits the maximum temperature. The turbine is thus caused to operate in the most efficient temperature range.

While we have shown the invention embodied in an aircraft air conditioning system, it will be apparent that it has utility in the air conditioning of other vehicular and also non-vehicular enclosures.

We claim:

1. A system for conditioning air for an enclosure comprising: a gas turbine compressor for supplying air under pressure; means for conducting air from said compressor to an enclosure; means for conditioning said air prior to delivery thereof to said enclosure; by-pass means around said conditioning means; a plurality of valve means including a valve member in said conducting means between the discharge of said compressor and the said conditioning means and a valve member in said by-pass means; means for controlling one of said valve members in response to variations in a desired characteristic of said enclosure, and means for controlling the other of said valve members in response to temperature variations in the gas turbine of said gas turbine compressor.

2. A system for conditioning air for an enclosure comprising means for supplying air under pressure; means for conducting air from said supplying means to an enclosure; means for conditioning said air prior to delivery thereof to said enclosure, said conditioning means including first and second heat exchangers; a first by-pass around said conditioning means; a second by-pass around the second heat exchanger only; valve means in said conducting means in advance of said first by-pass and in each of said by-passes; means for controlling one of said valves in response to variations in a desired characteristic of said enclosure; and means for controlling the other two of said valves in response to variations in a desired characteristic of said air supplying means.

3. A system for conditioning air for an enclosure comprising means for supplying air under pressure; means for conducting air from said supplying means to an enclosure; means for conditioning said air prior to delivery thereof to said enclosure, said conditioning means including first and second heat exchangers; a first by-pass around said conditioning means; a second by-pass around the second heat exchanger only; valve means in said conducting means in advance of said first by-pass and in each of said by-passes; means for controlling the valve in the first by-pass in response to variations in a desired characteristic of said enclosure; and means for controlling the other two valves in response to variations in a desired characteristic of said air supplying means.

4. An air conditioning system for an enclosure, said system comprising a gas turbine compressor for supplying heated air under pressure; means for conducting air from said compressor to said enclosure; primary and secondary heat extractors arranged in successive order in said conducting means; air temperature modulating means in said system including a first by-pass extending around said primary and secondary heat extractors; a second by-pass extending around said secondary heat extractor only; valve means in said by-passes; means responsive to variations in a desired characteristic in said enclosure for controlling one of said valves; and means responsive to variations in a desired characteristic of said gas turbine compressor for controlling the other of said valves.

5. An air conditioning system for an enclosure, said system comprising a gas turbine compressor for supplying heated air under pressure; means for conducting air from said compressor to said enclosure; primary and secondary heat extractors arranged in successive order in said conducting means; temperature modulating means in said system including a first by-pass extending around said primary and secondary heat extractors; a second by-pass extending around said secondary heat extractor only; valve means in said by-passes; means responsive to variations in a desired characteristic in said enclosure for controlling the valve means in said first by-pass; and means responsive to variations in a desired characteristic of said gas turbine compressor for controlling the valve in said second by-pass.

6. An air conditioning system for an enclosure, said system comprising a gas turbine compressor for supplying heated air under pressure; means for conducting air from said compressor to said enclosure; primary and secondary heat extractors arranged in successive order in said conducting means; valve means in said conducting means; air temperature modulating means in said system including a first by-pass extending around both heat extractors; a second by-pass extending around said secondary heat extractor only; valve means in said by-passes; means responsive to variations in a desired characteristic in said enclosure for controlling the valve means in said first by-pass; and a plurality of means responsive to variations in a desired characteristic of said gas turbine compressor for controlling the valve means in said conducting means and in said second by-pass, one means of said plurality being responsive to variations at one end of a predetermined temperature range and the other means of said plurality being responsive to variations at the other end of said temperature range.

7. An air conditioning system for an enclosure, said system comprising a gas turbine compressor for supplying heated air under pressure; means for conducting air from said compressor to said enclosure; primary and secondary heat extractors arranged in successive order in said conducting means; valve means in said conducting means; air temperature modulating means in said system including a first by-pass extending around both heat extractors; a second by-pass extending around said secondary heat extractor only; valve means in said by-passes; means responsive to variations in a desired characteristic in said enclosure for controlling the valve means in said first by-pass; and a pair of thermostats responsive to temperature variations in a predetermined zone in said gas turbine compressor for controlling the valve means in said conducting means and in said second by-pass, said thermostats being responsive to different temperatures at the opposite ends of a predetermined range of temperatures.

8. An air conditioning system for an enclosure, said system comprising a gas turbine compressor for supplying heated air under pressure; means for conducting air from said compressor to said enclosure; a heat extractor arranged in said conducting means; valve means in said conducting means; air temperature modulating means in said system including a by-pass around said heat extractor; valve means in said by-pass; and thermostatic means responsive to temperature variations in the outlet of the turbine of said gas turbine compressor to control the operation of said valve means, the thermostatic means for operating the first-mentioned valve means being responsive to the temperatures at one end of a predetermined range of temperatures, the thermostatic means for operating the second-mentioned valve means being responsive to the temperatures at the other end of said range.

9. An air conditioning system for an enclosure, said system comprising a gas turbine compressor for supplying heated air under pressure; means for conducting air from said compressor to said enclosure; refrigerating means in said conducting means; a by-pass extending around said refrigerating means; a first valve means in said conducting means; a second valve means in said by-pass; and first and second thermostatic means responsive to the temperatures in the outlet of the gas turbine of said gas turbine compressor, the first thermostatic means being connected with said first valve means to control the same at a predetermined temperature in the gas turbine outlet and the second thermostatic means being connected with said second valve means to control the same at a predetermined lower temperature in the gas turbine outlet.

10. An air conditioning system for an enclosure, said system comprising a gas turbine compressor for supplying heated air under pressure; means for conducting air from said compressor to said enclosure; refrigerating means in said conducting means; a by-pass extending around said refrigerating means; a first valve means in said conducting means; a second valve means in said by-pass; and first and second thermostatic means responsive to the temperatures in the outlet of the gas turbine of said gas turbine compressor, the first thermoplastic means being connected with said first valve means to initiate closing movement thereof at a predetermined temperature in the gas turbine outlet and the second thermostatic means being connected with said second valve means to initiate opening movement thereof at a predetermined lower temperature in the gas turbine outlet.

11. An air conditioning system for an aircraft enclosure, said system comprising a gas turbine compressor for supplying heated air under pressure; means for conducting air from said compressor to said enclosure; refrigerating means in said conducting means, said refrigerating means having a predetermined air flow capacity; a by-pass extending around said refrigerating means; a first valve means in said conducting means; a second valve means in said by-pass; and first and second thermostatic means in the outlet of the gas turbine of said gas turbine compressor, the first thermostatic means being connected with said first valve means and operative to initiate closing movement thereof at a predetermined maximum temperature in the gas turbine outlet, the second thermostatic means being connected with said second valve means and operative to initiate opening movement thereof at a predetermined minimum temperature in the gas turbine outlet.

12. An air conditioning system for an aircraft enclosure, said system comprising a gas turbine compressor for supplying heated air under pressure; means for conducting air from said compressor to said enclosure; refrigerating means in said conducting means, said refrigerating means having a predetermined air flow capacity; a by-pass extending around said refrigerating means; a first valve means in said conducting means; a second valve means in said by-pass; and means connected with said first and second valve means for effecting controlled operation thereof, said means being responsive to the loading conditions of the gas turbine of said gas turbine compressor, said first valve means being responsive to a predetermined maximum turbine loading, said second valve means being responsive to a predetermined minimum turbine loading.

13. An air conditioning system for an enclosure comprising means for supplying air under pressure; means for conducting air from said supplying means to said enclosure; primary and secondary heat extractors arranged in successive order in said conducting means; air temperature modulating means in said system including a first by-pass extending around said primary and secondary heat extractors; a second by-pass extending around said secondary heat extractor only; valve means in said conducting means immediately downstream of said first by-pass and in each of said by-passes; means for controlling the valve in the second by-pass in response to variations in a desired characteristic of said air supplying means; and means for controlling the other two valves in response to variations in a desired characteristic of said enclosure.

14. An air conditioning system for an enclosure comprising means for supplying air under pressure; means for conducting air from said supplying means to said enclosure; primary and secondary heat extractors arranged in successive order in said conducting means; air temperature modulating means in said system including a first by-pass extending around said primary and secondary heat extractors; a second by-pass extending around said secondary heat extractor only; valve means in said conducting means immediately downstream of said first by-pass and in each of said by-passes; means for controlling the valve in the second by-pass in response to variations in a desired characteristic of said air supplying means; and means for controlling the other two valves in response to variations in a desired characteristic of said enclosure, said two valves being so arranged that when one moves in an opening direction the other moves in a closing direction.

15. An air conditioning system for an enclosure, said system comprising a gas turbine compressor for supplying air under pressure, means for conducting air from said compressor to said enclosure; primary and secondary heat extractors arranged in successive order in said conducting means; air temperature modulating means in said system including a first by-pass extending around both heat extractors; a second by-pass extending around said secondary heat extractor only; first valve means in said conducting means in advance of said first by-pass; second valve means in said conducting means immediately downstream of said first by-pass; valves in each of said by-passes; a pair of thermostats responsive to temperature variations in a predetermined zone in said gas turbine compressor for controlling the first valve means in said conducting means and the valve in said second by-pass; said thermostats being responsive to different temperatures at the opposite ends of a predetermined range of temperatures; and means for controlling the second valve means in said conducting means and the valve in said first by-pass in response to variations in a desired characteristic of said enclosure, said second valve means and said valve in said first by-pass being so arranged that when one moves in an opening direction the other moves in a closing direction.

References Cited in the file of this patent

UNITED STATES PATENTS

| | | |
|---|---|---|
| 2,474,441 | Sparrow | June 18, 1949 |
| 2,622,406 | Scofield | Dec. 23, 1952 |
| 2,632,307 | Massey | Mar. 24, 1953 |

UNITED STATES PATENT OFFICE
CERTIFICATE OF CORRECTION

Patent No. 2,929,224                         March 22, 1960

Robert M. Pickard et al.

It is hereby certified that error appears in the printed specification of the above numbered patent requiring correction and that the said Letters Patent should read as corrected below.

Column 7, line 42, for "thermoplastic" read -- thermostatic --.

Signed and sealed this 20th day of September 1960.

(SEAL)
Attest:

KARL H. AXLINE
Attesting Officer

ROBERT C. WATSON
Commissioner of Patents